Patented Sept. 14, 1926.

1,599,569

UNITED STATES PATENT OFFICE.

LEON LILIENFELD, OF VIENNA, AUSTRIA.

CELLULOSE-ETHER SOLVENT AND COMPOSITION.

No Drawing. Application filed January 8, 1923. Serial No. 611,515.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible transparent film on the machines and by the methods now in use.

Certain of cellulose ethers are practically insoluble in water, and my invention relates but is not limited to the ethers having that property. While the ethers form thin solutions in "the lower monohydroxy aliphatic alcohols", it has been found that such solvents by themselves will not dissolve a sufficient proportion of the ethers to make a desirable thick flowable composition or dope, such as may be used in the manufacture of photographic film base by the customary methods, or in the other plastic arts.

I have discovered that an adequately strong and useful solvent may be prepared by mixing one or more of the lower monohydroxy aliphatic alcohols with nitromethane. While the proportions may vary widely, I find a useful range to be, by way of illustration, 90 to 3 parts of the monohydroxy aliphatic alcohol and 10 to 97 parts by weight of nitromethane.

While the amount of cellulose ether dissolved in my compound solvents may vary considerably, it is noted, by way of illustration, that 10 parts of water-insoluble ethyl cellulose dissolved in a mixture of 20 to 60 parts by weight of nitromethane and 80 to 40 parts of methyl or ethyl alcohol yields a flowable film-forming composition. As a further illustration, it is noted that a viscous film-forming composition, suitable for use in the customary machinery, can be made by dissolving 10 parts of water-insoluble ethyl cellulose in 30 parts of nitromethane and 30 parts of methyl or ethyl alcohol. Such a solution will be seen to contain over 14% of the cellulose ether.

In cellulose ether compositions prepared by my new mixture other substances may be incorporated which impart additional suppleness, or incombustibility, or other qualities to the film, such, for example, as triphenyl or tricresyl phosphate, camphor, etc.

The ingredients are of the ordinary commercial type, sufficiently purified for the process of film manufacture, so as to give a dope yielding film having the proper relative freedom from color. While I prefer to employ methyl or ethyl alcohol, or a mixture of them, the other lower monohydroxy aliphatic alcohols, isopropyl alcohol, propyl alcohol, butyl alcohol (normal, iso and secondary) and fusel oil are also useful to a considerable degree in connection with nitromethane. The term "monohydroxy alcohol" as herein employed, is intended to embrace the monohydroxy aliphatic alcohols of less than six carbon atoms.

The dopes prepared as above described, particularly with reference to the preferred form of my invention, can be used in connection with the usual film-forming apparatus without the necessity of expensive alterations in the latter.

Having thus described my invention, what I claim as new and desire to secure by Letters Patent is:

1. A compound solvent for ethers of cellulose, comprising a mixture of nitromethane and a lower monohydroxy aliphatic alcohol.

2. A compound solvent for alkyl ethers of cellulose, comprising from 97 to 10 parts of nitromethane and 3 to 90 parts of a lower monohydroxy aliphatic alcohol.

3. A compound solvent for water-insoluble alkyl cellulose, comprising nitromethane and methyl alcohol.

4. A viscous composition comprising a strong solution of alkyl ether of cellulose in a mixture of nitromethane and a lower monohydroxy aliphatic alcohol.

5. A viscous flowable film-forming composition, comprising an alkyl ether of cellulose dissolved in a compound solvent containing 60 to 20 parts by weights of nitromethane and 40 to 80 parts by weight of a lower monohydroxy aliphatic alcohol.

6. A composition of matter comprising 10 parts of water-insoluble ethyl cellulose and a compound solvent containing approximately 30 parts of nitromethane and 30 parts of methyl alcohol.

7. A composition of matter comprising an ether of cellulose dissolved in nitromethane and a liquid which by itself has a low capacity for dissolving cellulose ethers, but which liquid when mixed with nitromethane produces a mixture having a substantially greater solvent power than nitromethane for the cellulose ethers.

8. A thick viscous flowable composition comprising a strong solution of an ether of cellulose, dissolved in a mixed solvent including nitromethane.

9. A thick viscous flowable composition comprising a solution of an ether of cellulose, dissolved in a mixed solvent including nitromethane, such solution containing not substantially below 14% of the said ether of cellulose.

In testimony whereof I affix my signature.

Dr. LEON LILIENFELD.